United States Patent [19]

Aoyama et al.

[11] Patent Number: 4,695,425
[45] Date of Patent: Sep. 22, 1987

[54] FUEL ASSEMBLY

[75] Inventors: Motoo Aoyama, Hitachi; Hiromi Maruyama, Katsuta; Kikuo Umegaki, Hitachi; Sadao Uchikawa, Katsuta, all of Japan

[73] Assignee: Hitachi, Ltd., Tokyo, Japan

[21] Appl. No.: 657,082

[22] Filed: Oct. 3, 1984

[30] Foreign Application Priority Data

Oct. 4, 1983 [JP] Japan .................. 58-185330

[51] Int. Cl.$^4$ .................................. G21C 3/32
[52] U.S. Cl. ............................ 376/435; 376/267; 376/419; 376/428; 376/447
[58] Field of Search ............... 376/267, 419, 428, 435, 376/447

[56] References Cited

U.S. PATENT DOCUMENTS

| | | | |
|---|---|---|---|
| 3,503,848 | 3/1970 | Ransohoff | 376/267 |
| 3,745,069 | 7/1973 | Sofer | 376/435 |
| 4,018,697 | 4/1977 | Smith | 376/267 |
| 4,229,258 | 10/1980 | Takeda | 376/435 |
| 4,251,321 | 2/1981 | Crowther | 376/435 |

Primary Examiner—Donald P. Walsh
Attorney, Agent, or Firm—Antonelli, Terry & Wands

[57] ABSTRACT

A fuel assembly having a plurality of fuel rods arranged in a lattice state and being charged into a core of a nuclear reactor using light water as a coolant, which comprises the fuel rods consisting of a first group of fuel rods and a second group of fuel rods, an average concentration of $U^{236}$ in the first group being lower than an average concentration of $U^{236}$ in the second group, and the first group and the second group being arranged unevenly in the fuel assembly, preferably, a fuel assembly wherein the first group is arranged at the periphery of the fuel assembly, and the second group being arranged at positions other than the periphery, has a low reactivity penalty due to $U^{236}$ and can reduce the requirements for natural uranium.

10 Claims, 10 Drawing Figures

FIG. 8

| 20 | 19 | 19 | 18 | 18 | 18 | 19 | 20 |
|----|----|----|----|----|----|----|----|
| 19 | 21 | 17 | 17 | 17 | 21 | 18 | 19 |
| 19 | 17 | 17 | 17 | 17 | 17 | 21 | 18 |
| 18 | 17 | 17 | 17 | 6  | 17 | 17 | 18 |
| 18 | 17 | 17 | 6  | 17 | 17 | 17 | 18 |
| 18 | 21 | 17 | 17 | 17 | 17 | 17 | 19 |
| 19 | 18 | 21 | 17 | 17 | 17 | 21 | 19 |
| 20 | 19 | 18 | 18 | 18 | 19 | 19 | 20 |

FIG. 9

| 26 | 25 | 25 | 24 | 24 | 24 | 25 | 26 |
|----|----|----|----|----|----|----|----|
| 25 | 27 | 23 | 23 | 23 | 27 | 24 | 25 |
| 25 | 23 | 22 | 22 | 22 | 22 | 27 | 24 |
| 24 | 23 | 22 | 22 | 6  | 22 | 23 | 24 |
| 24 | 23 | 22 | 6  | 22 | 22 | 23 | 24 |
| 24 | 27 | 22 | 22 | 22 | 22 | 23 | 25 |
| 25 | 24 | 27 | 23 | 23 | 23 | 27 | 25 |
| 26 | 25 | 24 | 24 | 24 | 25 | 25 | 26 |

FIG. 10

| 31 | 30 | 30 | 29 | 29 | 29 | 30 | 31 |
|----|----|----|----|----|----|----|----|
| 30 | 32 | 28 | 28 | 28 | 32 | 29 | 30 |
| 30 | 28 | 28 | 28 | 28 | 28 | 32 | 29 |
| 29 | 28 | 28 | 28 | 6  | 28 | 28 | 29 |
| 29 | 28 | 28 | 6  | 28 | 28 | 28 | 29 |
| 29 | 32 | 28 | 28 | 28 | 28 | 28 | 30 |
| 30 | 29 | 32 | 28 | 28 | 28 | 32 | 30 |
| 31 | 30 | 29 | 29 | 29 | 30 | 30 | 31 |

FUEL ASSEMBLY

BACKGROUND OF THE INVENTION

This invention relates to a fuel assembly for light water type nuclear reactors, and more particularly to a fuel assembly using the uranium recovered from spent fuel.

In the conventional light water type nuclear reactor, for example, a boiling water type nuclear reactor, fuel assemblies containing enriched uranium having an average $U^{235}$ enrichment of about 3% by weight are usually burnt up to a degree of burnup of about 30 GWd/mt and discharged from the nuclear reactor.

An example of the fuel assemblies is shown in FIG. 1. A fuel assembly 3 is constituted of a plurality of fuel rods 1 and a channel box 2. Since a control rod 4 or a neutron detector instrumentation pipe 5 is provided outside the channel box 2, the distance between the adjacent fuel assemblies 3 are so wide that the devices such as control rod 4, etc. can be inserted therebetween, and the spaces between the fuel assemblies are filled with cooling water. The upper and lower ends of fuel rods 1 are supported by upper and lower tie plates (not shown in the drawing), respectively. Channel box 2 is fixed to the upper tie plate and surrounds a bundle of fuel rods 1. Numeral 6 is water rod, and numeral 7 is a coolant region among the fuel rods and a coolant passes through the coolant region.

The following main phenomena appear in the core with the progress of burning:

(i) Consumption of fissionable materials ($U^{235}$, $Pu^{239}$, $Pu^{241}$)
(ii) Conversion of fertile materials ($U^{238}$, $Pu_{240}$) to fissionable materials
(iii) Accumulation of fission products One example of changes in the $U^{235}$ enrichment (% by weight) with burning is shown in FIG. 2. As is obvious from FIG. 2, spent fuel still contains about 0.8% by weight of $U^{235}$. For effective utilization of uranium source, it may be possible to reprocess spent fuel, supply the recovered uranium again to an enrichment plant and reuse the recovered uranium reenriched to the necessary enrichment. However, reenrichment of recovered uranium and reuse of it as $UO_2$ fuel have the following problems.

With the progress of burning in a nuclear reactor, $U^{235}$ is consumed by nuclear fission, as given in the above (i), while some of $U^{235}$ is converted to $U^{236}$ through absorption of thermal neutrons. $U^{236}$ further absorbs the neutrons, producing $Np^{237}$ through successive $\beta$-decay. One example of changes in concentrations of $U^{236}$ and $Np^{237}$ (% by weight) with the progress of burning are shown in FIG. 3, where the curve 8 shows $U^{236}$ and the curve 9 shows $Np^{237}$, from which it is obvious that the spent fuel contains about 0.4% by weight of $U^{236}$ and about 0.03% by weight of $Np^{237}$. Both $U^{236}$ and $Np^{237}$ are neutron absorbers and their absorption cross-section for thermal neutrons at 2200 m/sec. is as large as 5.2 barns for $U^{236}$ and 170 barns for $Np^{237}$, as compared with 2.7 barns for $U^{238}$.

When the recovered uranium obtained by separating $Np^{237}$ from uranium through reprocessing is reused in $UO_2$ fuel, reactivity lowering (which will be hereinafter referred to as "reactivity penalty") corresponding to the $U_{236}$ concentration of $UO_2$ fuel takes place. To overcome the reactivity penalty, the $U^{235}$ enrichment must be increased, and this is quite contrary to the effective utilization of uranium source [T. Mikami: Kakurenryo Cycle no System (System for nuclear fuel cycle), published by Kyoritsu Publishing Co., Tokyo, March 1, 1980, pages 48–51].

The $U^{236}$ concentration of $UO_2$ fuel depends on a feed ratio of recovered uranium to natural uranium in an enriching plant. When a larger amount of recovered uranium is used to reduce the necessary amount of natural uranium, i.e. requirements for natural uranium, total absolute amount of $U^{236}$ contained in $UO_2$ fuel is increased, and thus the reactivity penalty due to $U^{236}$ is increased. Thus is a disadvantage so far encountered in the reuse of recovered uranium.

SUMMARY OF THE INVENTION

An object of the present invention is to provide a fuel assembly for light water type nuclear reactors, which can reduce the requirements for natural uranium by reutilizing uranium recovered by reprocessing spent fuel to lower the reactivity penalty due to $U^{236}$.

The present invention provides a fuel assembly having a plurality of fuel rods arranged in a lattice state and being charged into a core of a nuclear reactor using light water as a coolant, which comprises the fuel rods consisting of a first group of fuel rods and a second group of fuel rods, an average concentration of $U_{236}$ in the first group being lower than an average concentration of $U^{236}$ in the second group, and the first group and the second group being arranged unevenly in the fuel assembly.

According to one feature of the present invention, the second group is arranged at the periphery of the fuel assembly and the first group is arranged at positions other than the peripheral side in the fuel assembly.

According to another feature of the present invention, the first group is arranged at the periphery of the fuel assembly, and the second group is arranged at in the fuel assembly.

The relationship between the concentration of $U^{236}$ (% by weight) and the reactivity penalty due to $U^{236}$ at a constant enrichment of $U^{235}$ is shown in FIG. 4, wherein the straight line A shows the reactivity penalty of $U^{236}$ according to the conventional concept where the self-shielding effect is disregarded (T. Mikami: supra.), and curve B shows the reactivity penalty due to $U^{236}$ according to the present invention where the self-shielding effect is taken into account.

As is obvious from comparison of the conventional straight line A with the present curve B, the reactivity penalty per atom of $U^{236}$ is more decreased with increasing concentration of $U^{236}$ in the present curve B than in the straight line. This has be found due to the higher self-shielding effect at the resonance absorption of $U^{236}$. Thus, when a constant total absolute amount of recovered uranium is used, that is, when a constant total absolute amount of $U^{236}$ is contained in $UO_2$ fuel, the reactivity penalty due to $U^{236}$ can be lowered by unevenly distributing $U^{236}$, that is, localizing $U^{236}$, in the $UO_2$ fuel.

FIG. 5 shows changes in the reactivity penalty due to $U^{236}$ when a difference of the average concentration of $U^{236}$ contained in the fuel rods at the periphery, i.e. the outermost sides, of a fuel assembly from the average concentration of $U^{236}$ contained in the fuel rods at the interior, i.e. positions other than the periphery is changed, while the total absolute amount of $U^{236}$ contained in the fuel assembly is kept constant. It is obvious from FIG. 5 that an uneven distribution, i.e. localization, of $U^{236}$ in a fuel assembly can reduce the reactivity penalty due to $U^{236}$. This is a result of increasing the self-shielding effect by localizing $U^{236}$, as described above.

It is also seen from FIG. 5 that, when the average concentration of $U^{236}$ contained in the fuel rods at the outermost sides of a fuel assembly is made lower than that at the interior, i.e. at the positions other than the outermost sides, the reactivity penalty due to $U^{236}$ can be more lowered than when the average concentration of $U^{236}$ in the fuel rods at the outermost side of a fuel assembly is made higher than that at positions other than the outermost sides.

According to the neutron spectrum in a boiling water type nuclear reactor, the neutron absorption by $U^{236}$ occurs mainly in the resonance energy region [James J. Duderstadt, Lous J. Hamilton: Nuclear Reactor Analysis, published by John Wiley and Sons, Inc. New York (1976), pages 332-339].

FIG. 6 shows a spatial distribution of thermal neutron flux 10 and resonance energy region neutron flux 11 in a fuel assembly, where the abscissa shows the position depicted at the upper right corner of the diagram, and C on the diagram shows the center of a fuel assembly. A fuel assembly for a boiling water type nuclear reactor has much moderator (light water) at the outside of the fuel assembly shown in FIG. 1, and, thus, the neutron-moderating effect becomes larger at the periphery of the fuel assembly, and consequently the resonance energy region neutron flux at the periphery of the fuel assembly is increased by about 10%, as compared with that at the center of the fuel assembly, and the reactivity penalty due to $U_{236}$ is increased, as shown in FIG. 5.

It is seen from the foregoing that it is desirable to localize $U^{236}$ in fuel rods at positions other than the periphery of a fuel assembly to lower the reactivity penalty due to $U^{236}$ and to reduce the requirements for natural uranium.

BRIEF DESCRIPTION OF THE DRAWINGS

FIGS. 8, 9 and 10 show schematic cross-sectional plan views according to the present invention given in Examples 1, 2 and 3, respectively.

DESCRIPTION OF THE PREFERRED EMBODIMENTS

The present invention will be described in detail below, referring to Examples and a Comparative Example.

Comparative Example

Figure 1:
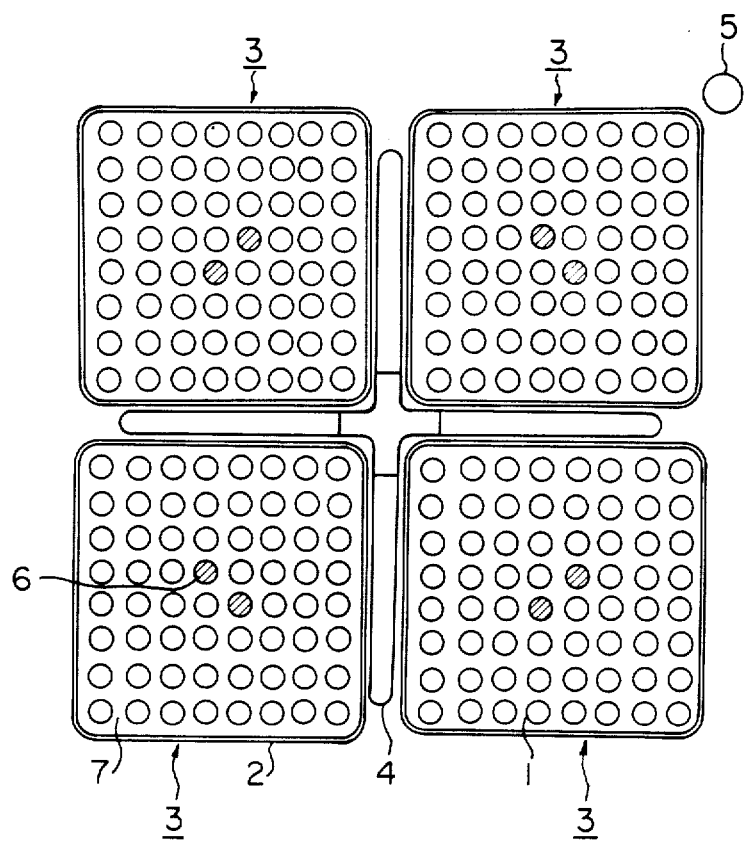
FIG. 1 is a cross-sectional plan view of the conventional fuel assemblies.
Figure 2:
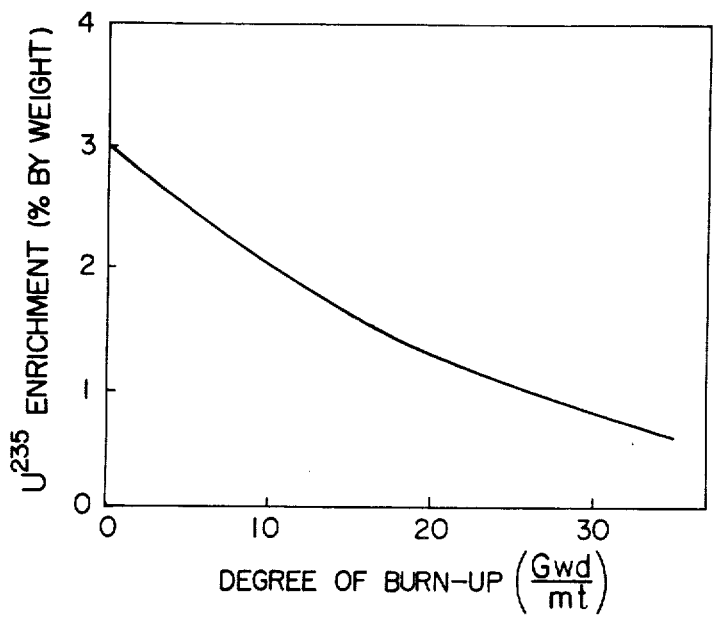
FIG. 2 is a diagram showing changes in $U^{235}$ enrichment with burning.
Figure 3:
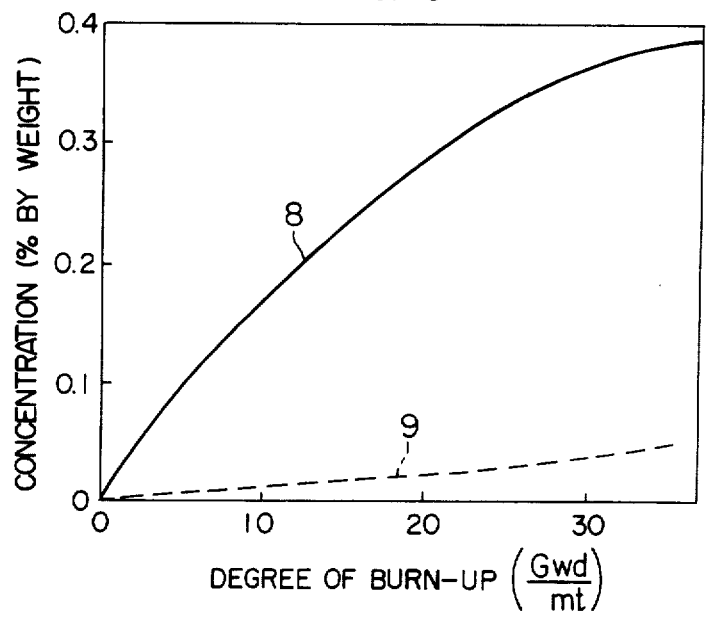
FIG. 3 is a diagram showing changes in concentrations of $U^{236}$ and $Np^{237}$ with burning.
Figure 4:
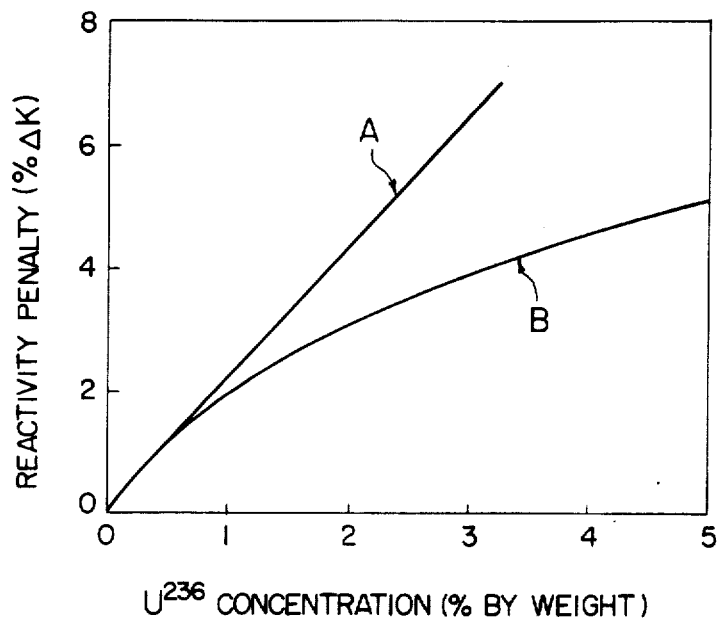
FIG. 4 is a diagram showing relationship between the concentration of $U^{236}$ and the reactivity penalty due to $U^{236}$.
Figure 5:
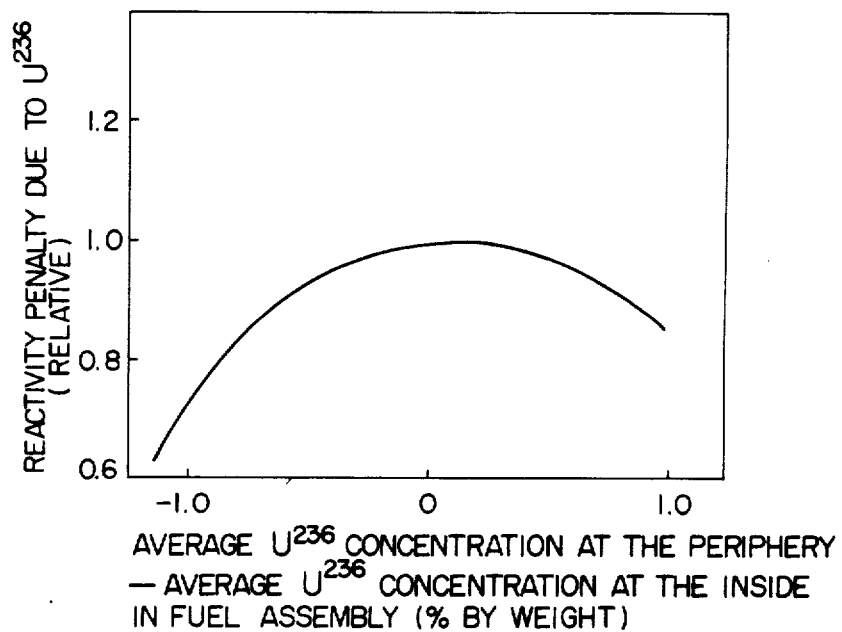
FIG. 5 is a diagram showing changes in the reactivity penalty due to $U^{236}$ when a difference of the average concentration of $U^{236}$ contained in the fuel rods at the periphery of a fuel assembly from that at the position other than the periphery is changed.
Figure 6:
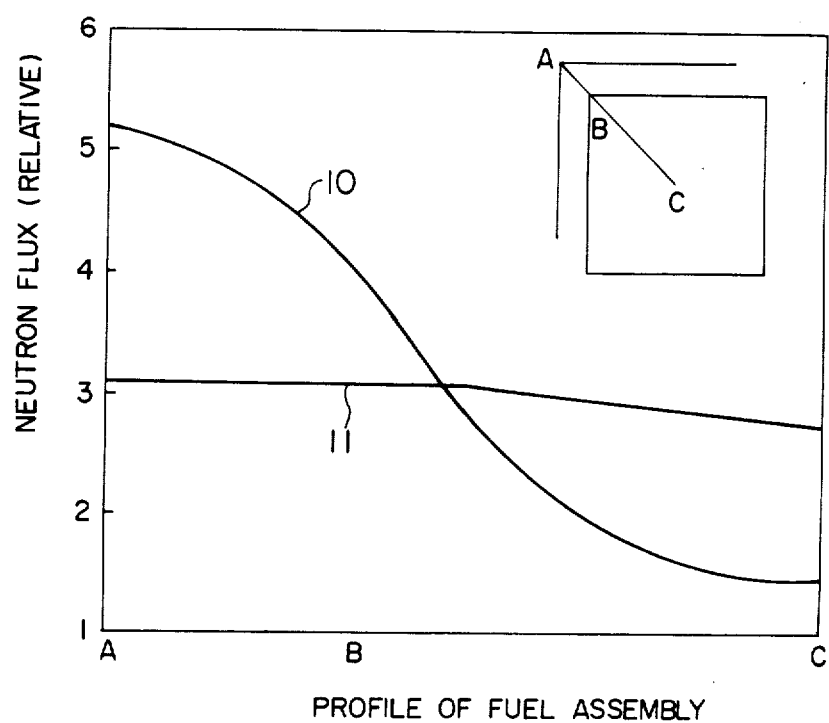
FIG. 6 is a diagram showing a spatial distribution of thermal neutron flux and resonance energy region neutron flux in a fuel assembly.
Figure 7:
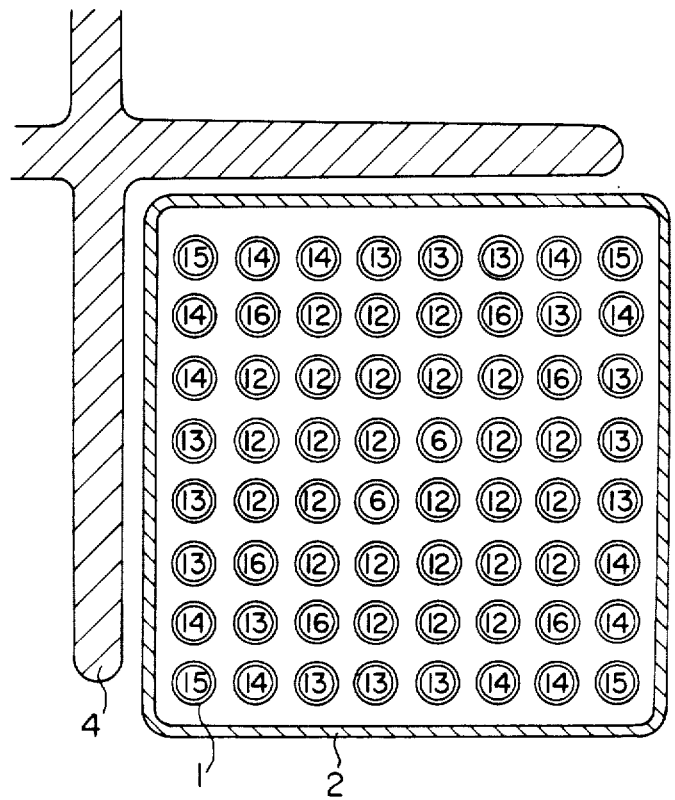
FIG. 7 is a cross-sectional plan view of the conventional fuel assembly.

For comparison, one example of the conventional fuel assembly will be given below. FIG. 7 is a cross-sectional plan view of the conventional fuel assembly having fuel rods in 8 lines and 8 rows, where all the fuel rods have an equal $U^{236}$ concentration, and numeral 1 is a fuel rod, numeral 2 a channel box, numeral 4 a control rod, and numeral 6 a water rod. Numerals 12, 13, 14, 15 and 16 given at the fuel rods show fuel rods having different $U^{235}$ enrichments. In table 1, enrichments of $U^{235}$ and concentration of $U^{236}$ are given for the fuel rods 12 to 16. The conventional fuel assembly given in this Comparative Example will be hereinafter referred to as Fuel Assembly I.

TABLE 1

| Fuel rod Numeral | 12 | 13 | 14 | 15 | 16 |
|---|---|---|---|---|---|
| $U^{235}$ enrichment (wt. %) | 3.6 | 2.7 | 2.4 | 1.9 | 2.7 |
| $U^{236}$ concentration (wt. %) | 0.5 | 0.5 | 0.5 | 0.5 | 0.5 |
| $Gd_2O_3$ concentration (wt. %) | 0 | 0 | 0 | 0 | 3 |
| Number of fuel rods per fuel assembly | 26 | 14 | 12 | 4 | 6 |

EXAMPLE 1

A schematic cross-sectional plan view of a fuel assembly according to one embodiment of the present invention is shown in FIG. 8, where no $U^{236}$ is contained in the fuel rods at the periphery of the fuel assembly, and $U^{236}$ is localized at the interior, i.e. than the periphery of the fuel assembly. The fuel assembly given in this Example will be hereinafter referred to as Fuel Assembly II.

TABLE 2

| Fuel rod numeral | 17 | 18 | 19 | 20 | 21 |
|---|---|---|---|---|---|
| $U^{235}$ enrichment (wt. %) | 3.6 | 2.7 | 2.4 | 1.9 | 2.7 |
| $U^{236}$ concentration (wt. %) | 1.0 | 0 | 0 | 0 | 1.0 |
| $Gd_2O_3$ concentration (wt. %) | 0 | 0 | 0 | 0 | 3 |
| Number of fuel rods per fuel assembly | 26 | 14 | 12 | 4 | 6 |

Average $U^{236}$ concentration of the fuel rods at the perphery (outermost sides) of fuel assembly: 0.0 wt. %
Average $U^{236}$ concentration of the fuel rods at the interior of fuel assembly: 0.94 wt. %

Distribution of $U^{235}$ enrichment throughout Fuel Assembly II is the same as that of Fuel Assembly I, and the total absolute amounts of $U^{236}$ contained in both Fuel Assemblies I and II, that is, the total absolute amounts of recovered uranium as reused are also equal to each other.

The neutron infinite multiplication factor of Fuel Assembly II is higher by about 0.4% $\Delta k$ than that of Fuel Assembly I as a base. As a result, the $U^{235}$ enrichment of Fuel Assembly II can be made lower than that of Fuel Assembly I, reducing the requirements for natural uranium by about 2%.

EXAMPLE 2

FIG. 9 shows a schematic cross-sectional plan view of another embodiment of the fuel assembly according to the present invention, wherein the $U^{236}$ concentration of the fuel rods at the interior of a fuel assembly is differentiated to further reduce the requirements for natural uranium. That is, $U^{236}$ concentration is increased in the fuel rods at the interior of a fuel assembly with smaller resonance energy region neutron flux. Distribution of $U^{235}$ enrichment and $U^{236}$ concentration is shown in Table 3. The fuel assembly given in this Example will be hereinafter referred to as Fuel Assembly III.

TABLE 3

| Fuel rod numeral | 22 | 23 | 24 | 25 | 26 | 27 |
|---|---|---|---|---|---|---|
| $U^{235}$ enrichment (wt. %) | 3.6 | 3.6 | 2.7 | 2.4 | 1.9 | 2.7 |
| $U^{236}$ concentration (wt. %) | 1.6 | 0.5 | 0 | 0 | 0 | 0.5 |
| $Gd_2O_3$ concentration (wt. %) | 0 | 0 | 0 | 0 | 0 | 3 |
| Number of fuel rods per fuel assembly | 14 | 12 | 14 | 12 | 4 | 6 |

Average $U^{236}$ concentration of the fuel rods at the perphery (outermost sides) of fuel assembly: 0.0 wt. %
Average $U^{236}$ concentration of the fuel rods at the interior of fuel assembly: 0.92 wt. %

Distribution of $U^{235}$ enrichment and total absolute amount of $U^{236}$ in Fuel Assembly III are the same as those of Fuel Assembly II, but the neutron infinite multiplication factor of Fuel Assembly III can be made higher than that of Fuel Assembly II, and thus the requirements for natural uranium can be made lower by about 3% than that of Fuel Assembly I.

EXAMPLE 3

FIG. 10 is a schematic cross-sectional plan view of further embodiment of the fuel assembly according to the present invention, where $U^{236}$ is localized at the peripheral side of a fuel assembly as shown in Table 4.

Distribution of $U^{235}$ enrichment and total absolute amount of $U^{236}$ in this embodiment is the same as that of Fuel Assembly I. Since $U^{236}$ is localized at the periphery of the fuel assembly with a large resonance energy region neutron flux, the natural uranium-saving effect is not higher than that of Example 1, but the requirements for natural uranium can be made lower by about 1% than those of Fuel Assembly I.

TABLE 4

| Fuel rod numeral | 28 | 29 | 30 | 31 | 32 |
|---|---|---|---|---|---|
| $U^{235}$ enrichment (wt. %) | 3.6 | 2.7 | 2.4 | 1.9 | 2.7 |
| $U^{236}$ concentration (wt. %) | 0 | 1.0 | 1.0 | 1.0 | 0 |
| $Gd_2O_3$ concentration (wt. %) | 0 | 0 | 0 | 0 | 3 |
| Number of fuel rods per fuel assembly | 26 | 14 | 12 | 4 | 6 |

Average $U^{236}$ concentration of the fuel rods at the periphery (outermost sides) of fuel assembly: 1 wt. %
Average $U^{236}$ concentration of the fuel rods at the interior of fuel assembly: 0.06 wt. %

As described above, the reactivity penalty due to $U^{236}$ can be lowered and the requirements for natural uranium can be reduced in a fuel assembly for light water type nuclear reactors using recovered uranium by localizing $U^{236}$ in the fuel assembly, preferably by making the average $U^{236}$ concentration of the fuel rods at the periphery of the fuel assembly lower than that at positions other than the periphery.

What is claimed is:

1. A fuel assembly comprising a plurality of fuel rods arranged in a lattice and being charged into a core of a BWR nuclear reactor using light water as a coolant, the fuel rods of the fuel assembly being divided into a first group of fuel rods and a second group of fuel rods, the first group of fuel rods having a first average concentration of $U^{236}$ and the second group of fuel rods having a second average concentration of $U^{236}$ higher than the first average concentration of the first group of fuel rods, the first group of fuel rods and the second group of fuel rods being arranged at different predetermined positions in the fuel assembly, the $U^{236}$ being $U^{236}$ recovered by reprocessing spent fuel, whereby a fuel assembly for a light water bwr nuclear reactor is provided which reduces the requirements for natural uranium by reutilizing uranium recovered by reprocessing spent fuel to lower the reactivity penalty due to $U^{236}$.

2. A fuel assembly according to claim 1, wherein the first group of fuel rods is arranged at the periphery of the fuel assembly, and the second group of fuel rods is arranged at positions in the fuel assembly other than the periphery of the fuel assembly.

3. A fuel assembly according to claim 2, wherein the average concentration of $U^{236}$ of the first group of fuel rods is zero.

4. A fuel assembly according to claim 1, wherein the second group of fuel rods is arranged at the periphery of the fuel assembly, and the first group of fuel rods is arranged at positions in the fuel assembly other than the periphery of the fuel assembly.

5. A fuel assembly according to claim 4, wherein the average concentration of $U^{236}$ of the first group of fuel rods is zero.

6. A fuel assembly according to claim 1, wherein the average concentration of $U^{236}$ of the first group of fuel rods is zero.

7. A fuel assembly according to claim 1, 2, 3, 4, 5 or 6, wherein at least one of the fuel rods of one of the first and second groups of fuel rods have a concentration of $U^{236}$ different from the other fuel rods of the one of the first and second group of fuel rods thereof.

8. A fuel assembly comprising a plurality of fuel rods arranged in a lattice and being charged into a core of a BWR nuclear reactor using light water as a coolant, the fuel rods of the fuel assembly being divided into a first group of fuel rods and a second group of fuel rods, an average concentration of $U^{236}$ in the first group of fuel rods being lower than an average concentration of $U^{236}$ in the second group of fuel rods, the first group of fuel rods being arranged at the periphery of the fuel assembly, and the second group of fuel rods being arranged at positions in the fuel assembly other than the periphery of the fuel assembly, the $U^{236}$ being $U^{236}$ recovered by reprocessing spent fuel, whereby a fuel assembly for a light water BWR nuclear reactor is provided which reduces the requirements for natural uranium by reutilizing uranium recovered by reprocessing spent fuel to lower the reactivity penalty due to $U^{236}$.

9. A fuel assembly according to claim 8, wherein the average concentration of $U^{236}$ of the first group of fuel rods is zero.

10. A fuel assembly according to claim 8, wherein at least one of the fuel rods of one of the first and second groups of fuel rods has a concentration of $U^{236}$ different from the concentration of the other fuel rods of the one of the first and second groups of fuel rods thereof.

* * * * *